US012755291B2

(12) United States Patent
Gao et al.

(10) Patent No.: US 12,755,291 B2
(45) Date of Patent: Oct. 6, 2026

(54) MULTI-AGENT GENERATIVE AI SYSTEMS

(71) Applicant: THE BOSTON CONSULTING GROUP, INC., Boston, MA (US)

(72) Inventors: Andrea Gao, Boston, MA (US); Urvi Awasthi, Boston, MA (US); Sanjay Elangovan, Boston, MA (US); Matthew Kropp, Boston, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 198 days.

(21) Appl. No.: 18/243,209

(22) Filed: Sep. 7, 2023

(65) Prior Publication Data

US 2025/0086647 A1 Mar. 13, 2025

(51) Int. Cl.
*G06Q 30/015* (2023.01)
*G06F 40/30* (2020.01)

(52) U.S. Cl.
CPC ........... *G06Q 30/015* (2023.01); *G06F 40/30* (2020.01)

(58) Field of Classification Search
CPC .............................. G06Q 30/015; G06F 40/30
See application file for complete search history.

(56) References Cited

U.S. PATENT DOCUMENTS

| | | | | |
|---|---|---|---|---|
| 2006/0106767 | A1* | 5/2006 | Adcock | G06F 40/247 |
| 2022/0329561 | A1* | 10/2022 | Salter | H04L 51/046 |
| 2024/0104091 | A1* | 3/2024 | Hamilton | G06F 16/24578 |
| 2024/0194194 | A1* | 6/2024 | Venkateswaran | G10L 15/22 |
| 2024/0355318 | A1* | 10/2024 | Beaver | G10L 15/063 |
| 2024/0370479 | A1* | 11/2024 | Hudetz | G06F 16/316 |
| 2025/0028752 | A1* | 1/2025 | Lauber | G06F 40/30 |
| 2025/0028910 | A1* | 1/2025 | Hasan Hashmi | G06F 40/35 |

OTHER PUBLICATIONS

Alessandro Russo, Dialogue Systems and Conversational Agents for Patients with Dementia: The Human-Robot Interaction, 2019, p. 109-110 (Year: 2019).*
Vaswani et al. "Attention Is All You Need," CoRR, Submitted on Jun. 12, 2017, arXiv:1706.03762v1, 15 pages.

* cited by examiner

*Primary Examiner* — Ibrahim N El-Bathy
(74) *Attorney, Agent, or Firm* — Fish & Richardson P.C.

(57) ABSTRACT

A multi-agent generative AI system is described. The system includes at least one data storage device storing a vector database, in which the vector database includes (i) a plurality of documents, and (ii) for each document of a plurality of documents, a respective document embedding that represents a semantic meaning of the document; at least one processor; and a memory communicatively coupled to the at least one processor, the memory storing instructions which, when executed by the at least one processor, cause the at least one processor to implement a computerized chat agent, a computerized retrieval agent, and a computerized triage agent.

20 Claims, 6 Drawing Sheets

MULTI-AGENT GENERATIVE AI SYSTEMS

TECHNICAL FIELD

This description generally relates to systems and methods for implementing a multi-agent generative artificial intelligence (AI) system.

BACKGROUND

The use of AI-driven chat programs, commonly known as "AI chatbots." has gained significant traction within the business landscape. These tools help businesses and organizations to reduce costs and enhance operational efficiency, particularly in managing customer service interactions. By employing natural language processing-techniques, AI chatbots adeptly connect enterprises with their customers, swiftly generating answers to frequently asked questions and furnishing general information to clients, thereby establishing a seamless and responsive customer communication channel.

SUMMARY

In general, one innovative aspect of the subject matter described in this specification can be embodied in a system that includes at least one data storage device storing a vector database, at least one processor, and a memory. The vector database includes (i) a plurality of documents, and (ii) for each document of a plurality of documents, a respective document embedding that represents a semantic meaning of the document. The memory is communicatively coupled to the at least one processor, and stores instructions which, when executed by the at least one processor, cause the at least one processor to implement a computerized chat agent, a computerized retrieval agent, and a computerized triage agent. The chat agent is configured to receive a user input at a chat window displayed at a user interface of a user computing device, and transmit at least the user input to the triage agent. The triage agent is configured to process at least the user input to generate a search query, and transmit the search query to the retrieval agent. The retrieval agent is configured to convert the search query received from the triage agent into a query embedding, query the vector database using the query embedding to retrieve one or more documents, each of the one or more documents having a respective document embedding that matches the query embedding, and send the retrieved one or more documents to the triage agent. The triage agent is further configured to, based on content of the selected one or more documents, generate instructions for the logical next step of the conversation, which it transmits to the chat agent. The chat agent is further configured to, based on the instructions received from the triage agent, generate a response to the user input, and display the response in the chat window at the user interface.

In some implementations, the triage agent includes a prompt generating module and can be further configured to generate, using the prompt generating module, based on the retrieved one or more documents, one or more prompts including one or more questions to the user to narrow down the retrieved one or more documents: transmit the one or more prompts to the chat agent: receive, from the chat agent, one or more answers of the user in response to the one or more prompts: select, based on the one or more answers, a document from the retrieved one or more documents that is most relevant to the search query: verify content of the selected document; and transmit the selected document to the chat agent.

In some implementations, the respective document embedding of each document is a vector including a dense representation of the document in a semantic latent space.

In some implementations, the query embedding is a vector including a dense representation of the query in a semantic latent space.

In some implementations, the respective document embedding matches the query embedding when the respective document embedding is the same as the query embedding.

In some implementations, the respective document embedding matches the query embedding when the respective document embedding is within a threshold distance of the query embedding.

In some implementations, the threshold distance is an Euclidean distance.

In some implementations, the system includes a large language model (LLM). In these implementations, the chat agent and the triage agent are configured to interact with the LLM through an application programing interface (API) of the LLM while processing the user input.

In some implementations, the LLM includes a generative transformer model that includes at least one of an encoder or a decoder.

In some implementation, the at least one of an encoder or a decoder is configured to apply a computerized attention mechanism over its respective inputs while processing the user input.

In some implementations, the vector database is a domain-specific database.

In some implementations, wherein the triage agent is further configured to: monitor a number of negative messages from the user on the chat window, and direct the chat to a human being if the number of negative message exceeds a threshold number.

Another innovative aspect of the subject matter described in this specification can be embodied in a system that includes at least one data storage device storing a vector database, at least one processor, and a memory. The vector database includes (i) a plurality of documents, and (ii) for each document of a plurality of documents, a respective document embedding that represents a meaning of the document. The memory is communicatively coupled to the at least one processor and stores instructions which, when executed by the at least one processor, cause the at least one processor to implement a computerized chat agent, a computerized retrieval agent, and a computerized triage agent. The chat agent is configured to receive a user input at a chat window displayed at a user interface of a user computing device, in which the user input relates to a technical problem associated with a product or a service, and transmit the user input to the triage agent. The triage agent is configured to determine, based on the user input, a list of possible diagnoses and root causes of the technical problem: transmit the list of possible diagnoses and root causes to the chat agent for determining a diagnose and a root cause of the technical problem: receive, from the chat agent, a conversational history as the diagnosis interactions are taking place, and make a determination of the diagnosis and the root cause of the technical problem. The triage agent is further configured to generate a technical summary of the diagnosis and root cause of the technical problem, and transmit the technical summary to the retrieval agent. The retrieval agent is configured to convert the technical summary into a query embedding, query the vector database using the query embedding to retrieve one or more documents, each of the one or more documents having a respective document embedding that matches the query embedding, and send the retrieved one or more documents to the chat agent. The chat agent is further configured to: based on content of the one or more retrieved documents, generate a response to the user input, and display the response in the chat window at the user interface.

In some implementations, determining, based on the user input, the list of possible diagnoses and root causes of the technical problem includes generating, based on the user input, one or more questions to the user to gather context information of the technical problem: transmitting the one or more questions to the chat agent: receiving, from the chat agent, one or more answers from the user, the one or more answers comprising the context information of the technical problem; and determining, based on the context information, the list of possible diagnoses and root causes of the technical problem.

In some implementations, the respective document embedding of each document is a vector including a dense representation of the document in a semantic latent space.

In some implementations, the query embedding is a vector including a dense representation of the query in a semantic latent space.

In some implementations, the respective document embedding matches the query embedding when the respective document embedding is the same as the query embedding.

In some implementations, the respective document embedding matches the query embedding when the respective document embedding is within a threshold distance of the query embedding.

In some implementations, the threshold distance is an Euclidean distance.

In some implementations, the system includes a large language model (LLM). The chat agent and the triage agent are configured to interact with the LLM while processing the user input.

In some implementations, the LLM can be hosted on a physical server on hardware owned by an entity that uses the multi-agent generative AI system to interact with users or customers.

In some other implementations, the LLM can be hosted on a remote server (e.g., a cloud computing system). In these implementations, the chat agent and the triage agent are configured to interact with the LLM through an application programming interface (API) of the LLM while processing the user input.

Other embodiments of this aspect include corresponding computer systems, apparatus, and computer programs recorded on one or more computer storage devices, each configured to perform the actions of each of the chat agent, the triage agent, and the retrieval agent. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by a data processing apparatus, cause the apparatus to perform the actions.

The subject matter described in this specification can be implemented in particular embodiments so as to realize one or more of the following technical advantages.

Generative AI chatbots are artificial intelligence systems designed to generate human-like text responses in natural language during interactive conversations. Unlike rule-based chatbots that follow predefined scripts, generative AI chatbots use machine learning techniques to understand context and generate relevant responses.

Generative AI chatbots have been used in modern business operations, particularly in managing customer service interactions. These chatbots can seamlessly interact with customers, answering common questions, providing product information, and handling simple customer service requests. However, when tasked with intricate customer support issues, existing generative AI chatbots often face challenges that result in what is colloquially referred to as "hallucination." This is a technical problem that occurs when the chatbot produces responses that are contextually plausible but factually incorrect or entirely fabricated. While handling complex problems, existing generative AI systems may generate information that appears coherent on the surface, yet lacks accurate understanding or proper verification. This can lead to misleading or inaccurate answers to customers' questions, potentially exacerbating customer frustrations and complicating problem resolution.

The techniques described in this specification allow a generative AI chatbot to generate more accurate responses to customer questions and more effective, precise solutions to customer support issues (in comparison to existing generative AI chatbots) by implementing a multi-agent generative AI system that includes a computerized chat agent, a computerized triage agent, and a computerized retrieval agent. The chat agent is configured to have a conversation with the customer. The chat agent is guided by a triage agent that conducts reasoning on the customer's questions and/or issues. The triage agent creates search queries for the retrieval agent to embed to retrieve, from a domain-specific vector database, one or more document(s) that are most relevant to the question or issue. The retrieved documents are used to generate accurate responses to the customer questions/issues.

By implementing a unique combination of these three agents, the generative AI chatbot can avoid the above-described hallucination problem. As a result, the multi-agent generative AI system can reduce an amount of computational resources and data storages that would otherwise be required by other generative AI systems for improving training data and fine-tuning algorithms to prevent hallucination.

Further, the systems and techniques described herein can be performed by a computer system using computer-specific techniques to achieve a result that otherwise would require subjective input from a human. For example, a computer system can implement the described multi-agent generative AI system to resolve a complex customer support issue. Absent these techniques, a human would subjectively review the complex customer issue and determine a solution based on subjective factors and considerations. This may result in answers that are less accurate than those generated by the described multi-agent generative AI system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
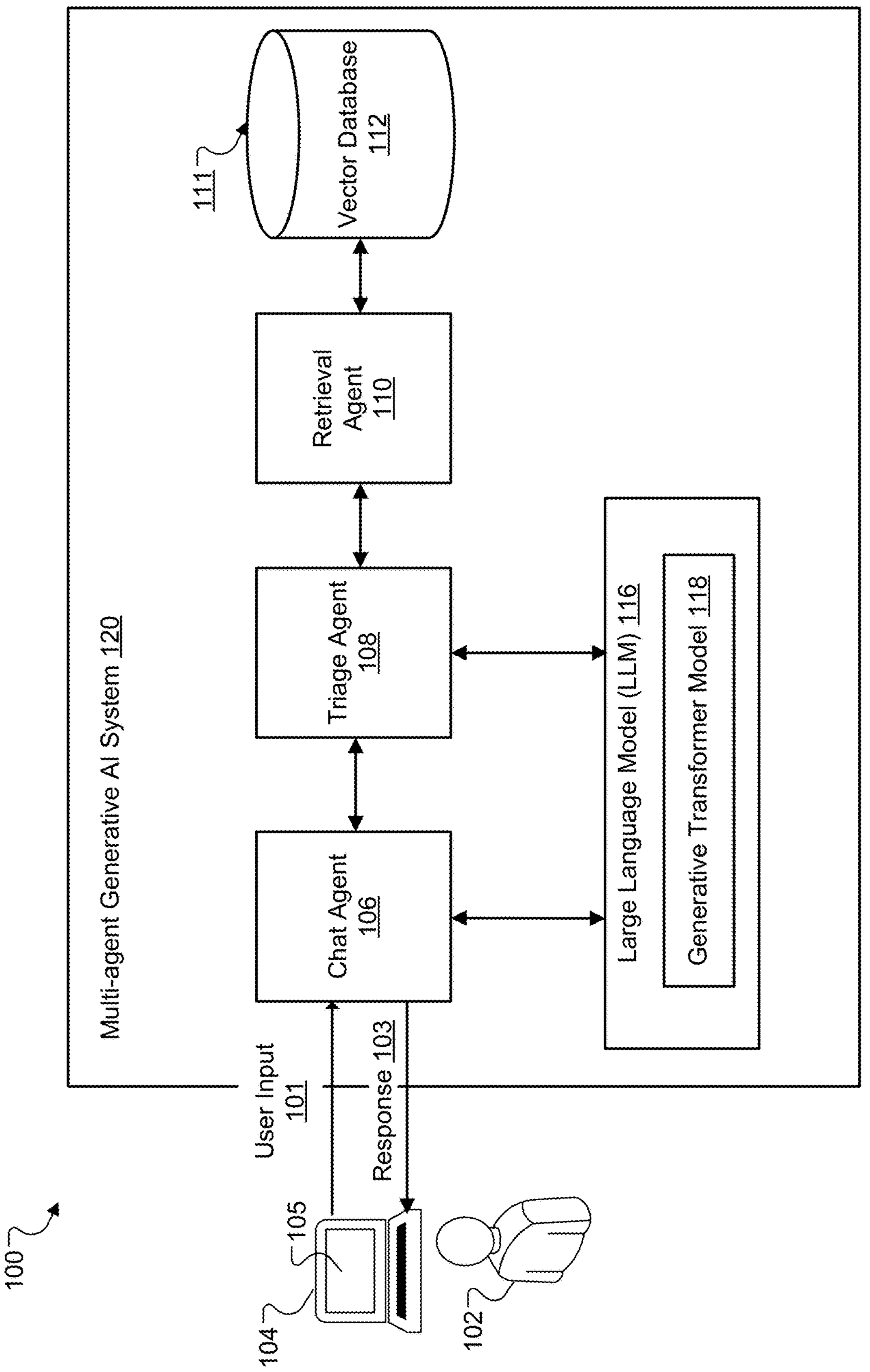
FIG. 1 shows an example of a computing environment including a multi-agent generative AI system for automated chatting.

FIG. 1 shows an example of a computing environment including a multi-agent generative AI system 120 for automated chatting and a user device 104 of a user 102. The multi-agent generative AI system 120 is an example of a system implemented as computer programs on one or more computers in one or more locations, in which the systems, components, and techniques described below can be implemented.

The multi-agent generative AI system is an example of a server system implemented as computer programs on one or more computers in one or more locations, in which the systems, components, and techniques described below can be implemented. The user device 104 can include any appropriate type of computing device such as a desktop computer, a laptop computer, a handheld computer, a tablet computer, a personal digital assistant (PDA), a cellular telephone, a network appliance, a camera, a smart phone, a smart watch, an enhanced general packet radio service (EGPRS) mobile phone, a media player, a navigation device, an email device, a game console, or an appropriate combination of any two or more of these devices or other data processing devices.

The user device 104 can communicate with the system 120 via a communication network (not shown). The communication network can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

The multi-agent generative AI system 120 includes a chat agent 106, a triage agent 108, and a retrieval agent 110. Each of the chat agent 106, the triage agent 108, and the retrieval agent 110 is an engine that is implemented as one or more software modules or components, installed on one or more computers in one or more locations. In some cases, one or more computers will be dedicated to a particular engine: in other cases, multiple engines can be installed and running on the same computer or computers.

Figure 4:
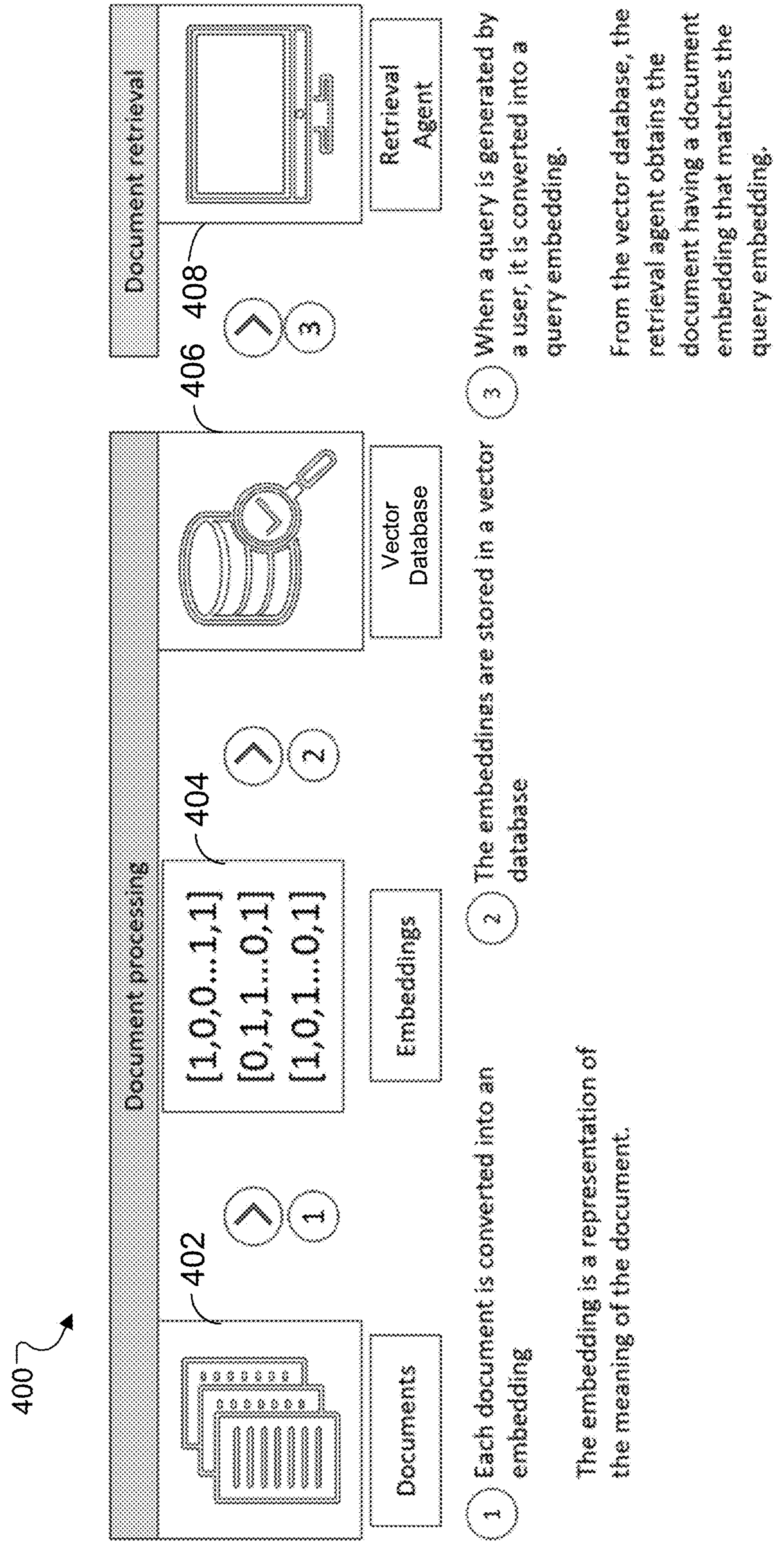
FIG. 4 illustrates an example process for processing documents and retrieving, from a vector database, one or more documents relevant to the search query.
Figure 5:
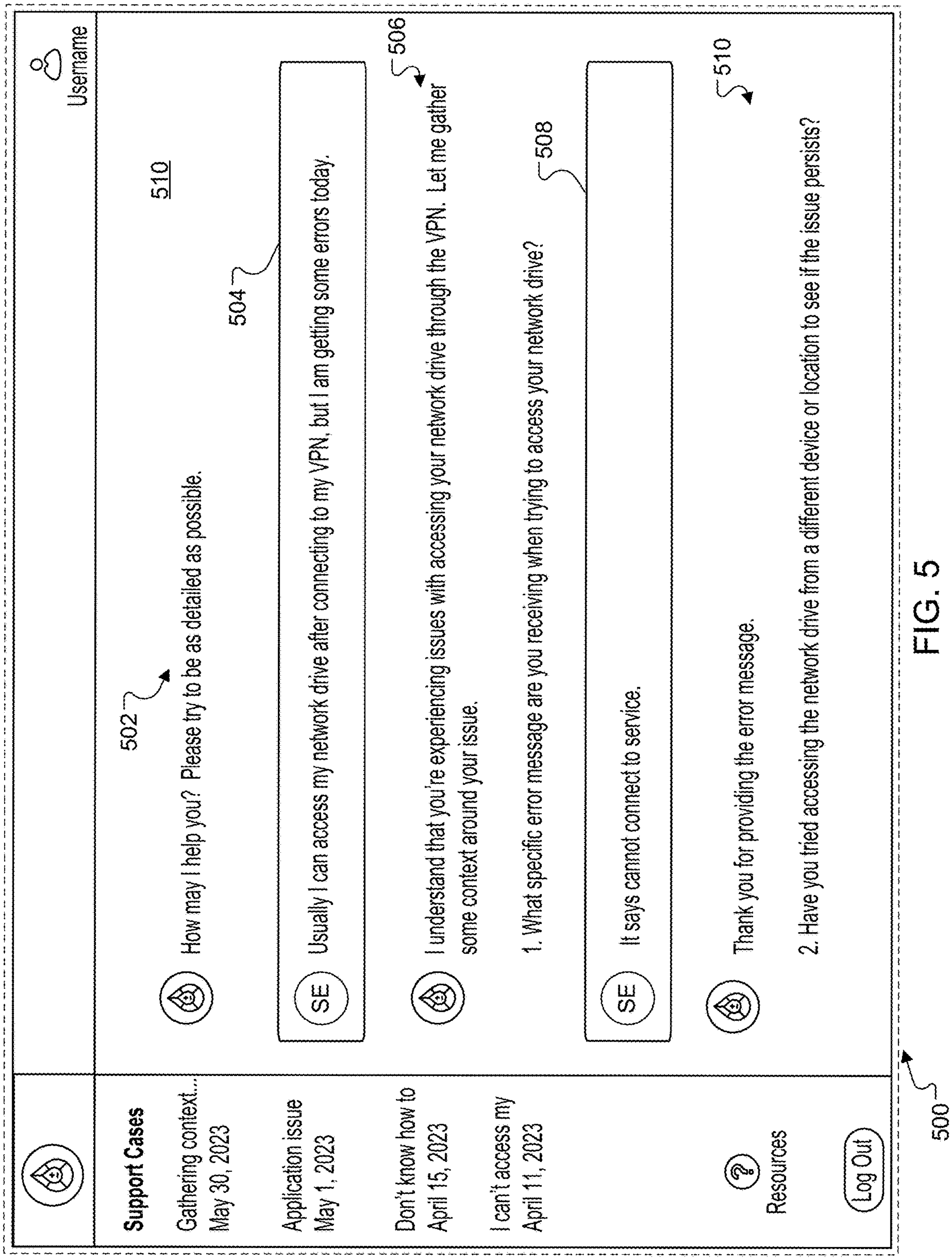
FIG. 5 illustrates another example user interface of a chatbot that implements the multi-agent generative AI system.

The multi-agent generative AI system 120 includes at least one storage device 111 that includes a vector database 112. The vector database stores multiple documents, and for each document of the multiple documents, a respective document embedding that represents a semantic meaning of the document. In some implementations, the respective document embedding of each document is a vector including a dense representation of the document in a semantic latent space. Examples of document embeddings are shown in FIG. 4.

The multi-agent generative AI system 120 includes a large language model (LLM) 116. The chat agent 106 and triage agent 108 are configured to interact with the LLM 116 while processing one or more user queries.

In some implementations, the LLM can be hosted on a physical server on hardware owned by an entity that uses the multi-agent generative AI system to interact with users or customers.

In some other implementations, the LLM can be hosted on a remote server (e.g., a cloud computing system). In these implementations, the chat agent and the triage agent are configured to interact with the LLM through an application programming interface (API) of the LLM while processing the user input.

Generally, the LLM 116 includes a generative transformer model 118 that includes at least one of an encoder or a decoder. At least one of an encoder or a decoder is configured to apply a computerized attention mechanism over its respective inputs while the one or more user queries are being processed by the system 120. Examples of generative transformer models are described in detail below.

As shown in the example of FIG. 1, the user device 110 is a laptop of a user 102 who is interacting with the multi-agent generative AI system 120 through a user interface 105. The system 120 is deployed by one or more computers controlled by an organization. In some implementations, the one or more computers are part of an internal computing system residing at the organization. In some implementations, the one or more computers are distributed computing devices (e.g., cloud computing devices). In some implementations, the one or more computers include both local computers and cloud computing computers.

In some implementations, the organization is a business entity and the user is a customer of a business entity. The user has a customer support issue that needs to be resolved by the business entity. In some other implementations, the user is a member of the organization and needs to obtain information regarding the organization and/or operations of the organization. In some other implementations, the user is a user of a product or service of a company and has a technical issue related to the product or service.

The chat agent 106 is configured to have a conversation with the user 102 through the user interface 105. The conversation can be conducted in a regulated mode or a conversational mode. The regulated mode is for well-defined problems that requires domain-specific knowledge to solve the problems. The regulated mode can be particularly useful when the user 102 and the organization are in highly regulated industries, for example, legal, accounting, and banking industries. The conversational mode is for problems that are less well-defined and more complex, and the user 102 needs the system 120 to identify and diagnose the problems.

The chat agent 106 is configured to receive, at a chat window of the user interface 105 a user input 101 which describes a customer support issue or a question from the user 102 to the organization. Optionally, the chat agent 106 may prompt the user 102 for more information to clarify the question or issue raised in the user input 101 upon instruction from the triage agent 108.

The chat agent 106 is guided by the triage agent 108 that conducts reasoning on the user 102's question or issue and optionally, on additional information provided by the user 102 in response to prompts from the chat agent 106. The triage agent 108 is configured to generate a search query that represents the user 102's question or issue and sends the search query to the retrieval agent 110. The retrieval agent

110 is configured to generate query embeddings from the search query received from the triage agent 108 and to retrieve, from the vector database 112, one or more documents that are most relevant to the search query 101. Generally, the retrieval agent 110 retrieves the one or more documents from the vector database 112 by using semantic search of document embeddings based on the query embeddings. The process of retrieving the one or more documents is described in more detail below with reference to FIG. 4.

Figure 6:
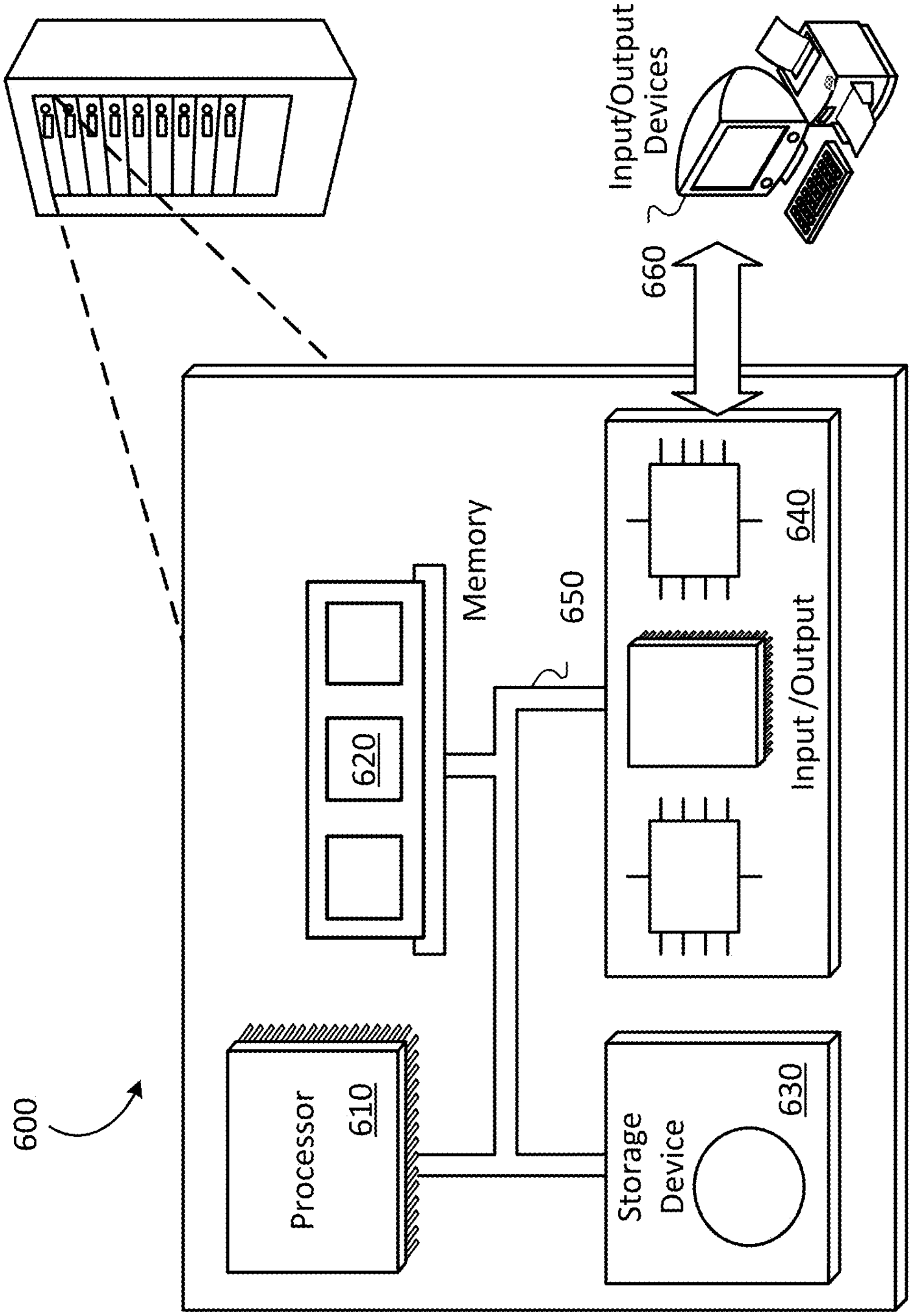
FIG. 6 depicts an example computing system, according to implementations of the present disclosure.

Based on content of the retrieved one or more documents, the triage agent 108 is configured to generate instructions for a logical direction of the conversation (e.g., instructions for the next logical conversational step), and transmit the instructions to the chat agent 106, which is configured to generate a response 103 to the user input 101 based on the instructions, and display a response 103 in the chat window of the user interface 105. An example of a chat window and conversation between the user 102 and the chat agent 106 is shown in FIG. 6.

An example architecture of the chat agent, the triage agent, and the retrieval agent in the regulated mode is described in detail below with reference to FIG. 2. An example architecture of the chat agent, the triage agent, and the retrieval agent in the conversational mode is described in detail below with reference to FIG. 3.

While processing the user input 101 and generating the response 103, the chat agent 106 and the triage agent 108 may utilize the large language model 116 in order to leverage the native knowledge of the LLM and augment the native knowledge of the LLM with the domain-specific knowledge contained in the one or more documents retrieved from the vector database 112. These techniques allow the chat agent 106 to generate more accurate, responsible, and robust responses to user questions or customer support issues in comparison to responses that would be generated by existing generative AI chatbots Example Generative Transformer Models In general, the generative transformer model 118 is a deep learning model that operates according to the principle of self-attention (e.g., a computer-specific technique that mimics cognitive attention). For example, the generative transformer model 118 differentially weighs the significance of each part of an input (which includes the recursive output) data, and uses one or more attention mechanism to provide context for any position in the input sequence.

A generalized architecture of a generative transformer model is described below.

Input:

In general, input data strings are parsed into tokens (e.g., by a byte pair encoding tokenizer). Further, each token is converted via a word embedding into a vector. In some implementations, positional information of the token can be added to the word embedding.

Encoder/Decoder Architecture:

In general, a generative transformer model includes a decoder. Further, in some implementations, the generative transformer model can also include an encoder. An encoder includes one or more encoding layers that process the input iteratively one layer after another, while the decoder includes one or more decoding layers that perform a similar operation with respect to the encoder's output.

Each encoder layer is configured to generate encodings that contain information about which parts of the inputs are relevant to each other, and passes these encodings to the next encoder layer as inputs. Each decoder layer performs the functional opposite, by taking all the encodings and using their incorporated contextual information to generate an output sequence in natural language. To achieve this, each encoder and decoder layer can make use of an attention mechanism.

For each part of the input, an attention mechanism weights the relevance of every other part and draws from them to produce the output. Each decoder layer has an additional attention mechanism that draws information from the outputs of previous decoders, before the decoder layer draws information from the encodings.

Further, the encoder and/or decoder layers can have a feed-forward neural network for additional processing of the outputs and contain residual connections and layer normalization steps.

As an example, one or more attention mechanism can be configured to implement scaled dot-product attention. For instance, when an input data string is passed into the generative transformer model, attention weights can be calculated between every token simultaneously. An attention mechanism can produce embeddings for every token in context that contain information about the token itself along with a weighted combination of other relevant tokens each weighted by its attention weight.

For each attention unit, the generative transformer model learns three weight matrices: the query weights $W_Q$, the key weights $W_K$, and the value weights Wy. For each token i, the input word embedding $x_1$ is multiplied with each of the three weight matrices to produce a query vector $q_i=x_iW_Q$, a key vector $k_i=x_iW_K$, and a value vector $v_i=x_iW_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training, and passed through a softmax which normalizes the weights. The fact that $W_Q$ and $W_K$ are different matrices allows attention to be non-symmetric: if token j (e.g., $q_i \cdot k_j$ is large), this does not necessarily mean that token j will attend to token i (e.g., $q_i \cdot k_j$ could be small). The output of the attention unit for token i is the weighted sum of the value vectors of all tokens, weighted by $a_{ij}$, the attention from token i to each token.

The attention calculation for all tokens can be expressed as one large matrix calculation using the softmax function, which is useful for training due to computational matrix operation optimizations that quickly compute matrix operations. The matrices Q, K, and V are defined as the matrices where the ith rows are vectors $q_i$, $k_i$, and $v_i$, respectively. Accordingly, attention can be presented as:

$$\text{Attention}(Q, K, V) = softmax\left(\frac{QK^T}{\sqrt{d_k}}\right)V$$

where softmax is taken over the horizontal axis.

In general, one set of ($W_Q$, $W_K$, $W_V$) matrices may be referred to as an attention head, and each layer in a generative transformer model can have multiple attention heads. While each attention head attends to the tokens that are relevant to each token, with multiple attention heads the model can do this for different definitions of "relevance."

In addition, the influence field representing relevance can become progressively dilated in successive layers. Further, the computations for each attention head can be performed in parallel, which allows for fast processing. The outputs for the attention layer are concatenated to pass into the feed-forward neural network layers.

Encoder:

In general, encoder can include two major components: a self-attention mechanism and a feed-forward neural network. The self-attention mechanism accepts input encodings from the previous encoder and weights their relevance to each other to generate output encodings. The feed-forward neural network further processes each output encoding individually. These output encodings are then passed to the next encoder as its input, as well as to the decoders.

The first encoder takes positional information and embeddings of the input sequence as its input, rather than encodings.

The encoder is bidirectional. Attention can be placed on tokens before and after the current token.

A positional encoding is a fixed-size vector representation that encapsulates the relative positions of tokens within a target sequence.

The positional encoding is defined as a function of type f: $\mathbb{R} \to \mathbb{R}^d$: $d \in \mathbb{Z}$, $d>0$, where d is a positive even integer. The full position encoding can be represented as follows:

$$(f(t)_{2k},\ f(t)_{2k}+1) = (\sin(\theta),\ \cos(\theta))\ \ \forall\, k \in \{0, 1, \ldots, d/2-1\} \quad \text{where}$$

$$\theta = \frac{t}{r_k},\ r = N^{2/d}.$$

Here, N is a free parameter that is significantly larger than the biggest k that would be input into the positional encoding function.

This positional encoding function allows the generative transformation model to perform shifts as linear transformations:

$$f(t+\Delta t) = \operatorname{diag}(f\Delta t))f(t)$$

where $\Delta t \in \mathbb{R}$ is the distance one wishes to shift. This allows the transformer to take any encoded position, and find the encoding of the position n-steps-ahead or n-steps-behind, by a matrix multiplication.

By taking a linear sum, any convolution can also be implemented as linear transformations:

$$\sum_j c_j f(t+\Delta t_j) = \left(\sum_j c_j \operatorname{diag}(f(\Delta t_j))\right) f(t)$$

for any constants $c_j$. This allows the transformer to take any encoded position and find a linear sum of the encoded locations of its neighbors. This sum of encoded positions, when fed into the attention mechanism, would create attention weights on its neighbors, much like what happens in a convolutional neural network language model.

Although an example positional encoding technique is described above, in practice, other positional encoding techniques can also be performed, either instead or in addition to those described above. Further, in some implementations, the generative transformer model need not perform positional encoding.

Decoder:

Each decoder includes three major components: a self-attention mechanism, an attention mechanism over the encodings, and a feed-forward neural network. The decoder functions in a similar fashion to the encoder, but an additional attention mechanism is inserted which instead draws relevant information from the encodings generated by the encoders. This mechanism can also be called the encoder-decoder attention.

Like the first encoder, the first decoder takes positional information and embeddings of the output sequence as its input, rather than encodings. The transformer does not use the current or future output to predict an output, so the output sequence is partially masked to prevent this reverse information flow. This allows for autoregressive text generation. For all attention heads, attention cannot be placed on following tokens. The last decoder is followed by a final linear transformation and softmax layer, to produce the output probabilities.

As described above, in some implementations, the generative transformer model can include an encoder to facilitate product predictions based on additional contextual information (e.g., contextual information regarding the purchases made by one or more other customers). This allows the generative transformer model to make product predictions for a customer more accuracy (e.g., by taking into account both the customer's product selections, as well as based contextual information regarding the purchases made by others). As an example, this additional contextual information can be used to identify seasonal purchasing trends (e.g., due to holiday). Nevertheless, in some implementations, he generative transformer model does not include an encoder (e.g., the generative transformer model can include only a decoder).

Additional information regarding generative transformer models can be found in "Attention Is All You Need," arXiv:1706.03762 by Vaswani, et al.

Figure 2:
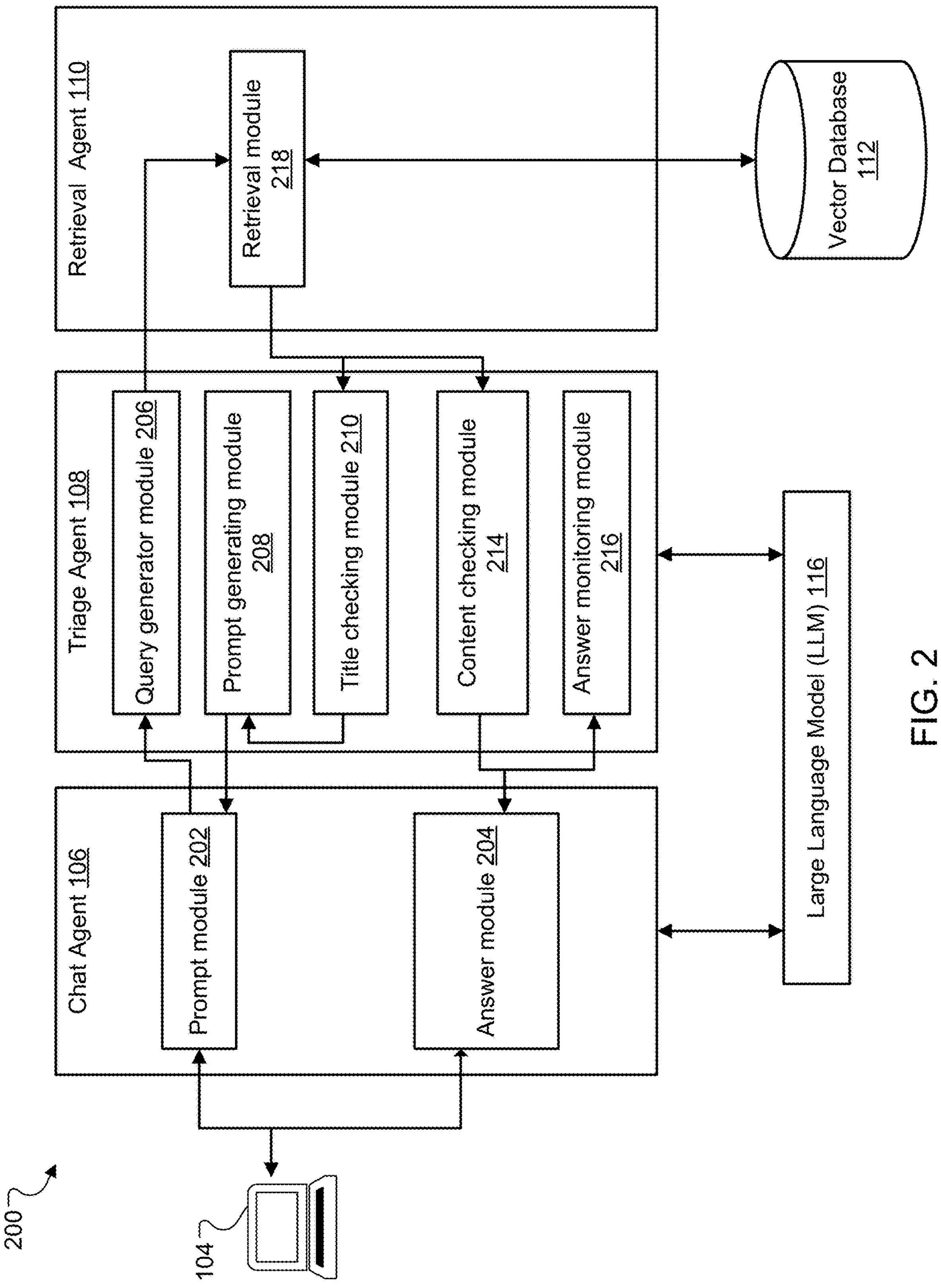
FIG. 2 shows an example architecture of the chat agent, the triage agent, and retrieval agent in regulated mode.

FIG. 2 shows an example architecture 200 of the chat agent, the triage agent, and retrieval agent in regulated mode.

The chat agent 106 includes a prompt module 202 and an answer module 204. The triage agent 108 includes a query generator module 206, a prompt generating module 208, a title checking module 210, a content checking module 214, and an answer monitoring module 216. The retrieval agent 110 includes a retrieval module 218. Each module is a software-based system, subsystem, or process that is programmed to perform one or more specific functions. Generally, a module will be implemented as one or more software components, installed on one or more computers in one or more locations. In some cases, one or more computers will be dedicated to a particular module: in other cases, multiple modules can be installed and running on the same computer or computers.

Generally, the chat agent 106 is configured to receive a user input 101 at a chat window displayed at a user interface of a user computing device, and transmit the user input to the triage agent. The triage agent 108 is configured to process at least the user input 101 to generate a search query.

In some implementations, when there is a conversational history between the chat agent 106 and the user, the triage agent is configured to review the conversational history received from the chat agent 106, and to generate a search query based on the user input and the conversational history.

The triage agent 108 is configured to transmit the search query to the retrieval agent 110. The retrieval agent 110 is configured to convert the query into a query embedding, and use the query embedding to query the vector database 112 to retrieve one or more documents, each of the one or more documents having a respective document embedding that matches the query embedding, and send the retrieved one or more documents to the triage agent 108. The triage agent

108 is further configured to, based on content of the retrieved one or more documents, generate one or more instructions for the chat agent 106 to respond to the user input. The chat agent 106 is configured to respond to the user input based on the one or more instructions and display the response in the chat window at the user interface.

More specifically, the prompt module 202 is configured to receive the user input and transmit the user input to the query generator module 206. The query generator module 206 is configured to review the conversational history and generate a concise search query.

The retrieval module 218 is configured to convert the search query into a query embedding. In some implementations, the query embedding is a dense representation of the query in a semantic latent space. The retrieval module 218 is further configured to query the vector database 112 using the query embedding to retrieve one or more documents. Each of the one or more documents has a respective document embedding that matches the query embedding. In some implementations, the respective document embedding matches the query embedding when the respective document embedding is the same as the query embedding. In some other implementations, the respective document embedding matches the query embedding when the respective document embedding is within a threshold distance of the query embedding. For example, the threshold distance can be a Euclidean distance. In some other implementations, the respective document embedding matches the query embedding when a level of similarity between the respective document embedding and the query embedding exceeds a threshold level. For example, the level of similarity is a cosine similarity between the respective document embedding and the query embedding.

The retrieval module 218 transmits the retrieved one or more documents to the triage agent. The title checking module 210 is configured to check whether the retrieved one or more documents include multiple documents (i.e., two or more documents). If two or more documents are retrieved, the title checking module 210 is configured to check whether the two or more documents are relevant to the search query, for example, based on the titles of the two or more documents. If any of the two or more documents is not relevant to the search query, the title checking module can be configured to remove the irrelevant document and only keep the relevant documents for further processing. If there are two or more documents relevant to the search query, the title checking module 210 instructs the prompt generating module 208 to generate, based on the retrieved two or more documents, one or more prompts including one or more questions to be asked to the user to narrow down the retrieved two or more documents. The prompt generating module 208 is configured to transmit the one or more prompts to the prompt module 202 of the chat agent 106. The prompt module 202 is configured respond to the user input with the prompts as per instructions, and to display the response on the chat window of the user interface and to receive one or more answers of the user in response to the one or more prompts.

The prompt generating module 208 is configured to select, based on the one or more answers, a document from the retrieved one or more documents that is most relevant to the search query. The content checking module 214 is configured to verify the relevancy and validity of the content of the selected document. The content checking module 214 is configured to transmit the selected document to the answer module 204 of the chat agent 106. Based on the content of the selected document, the answer module 204 is configured to chat with the user to walk them through the document step-by-step so as to solve their technical problem, displaying the responses in the chat window at the user interface.

The answer monitoring module 216 is configured to monitor a number of negative messages from the user in the chat window. If the number of negative message exceeds a threshold number, the answer monitoring module 216 will direct the chat between the user and the chat agent 106 to a human being.

Figure 3:
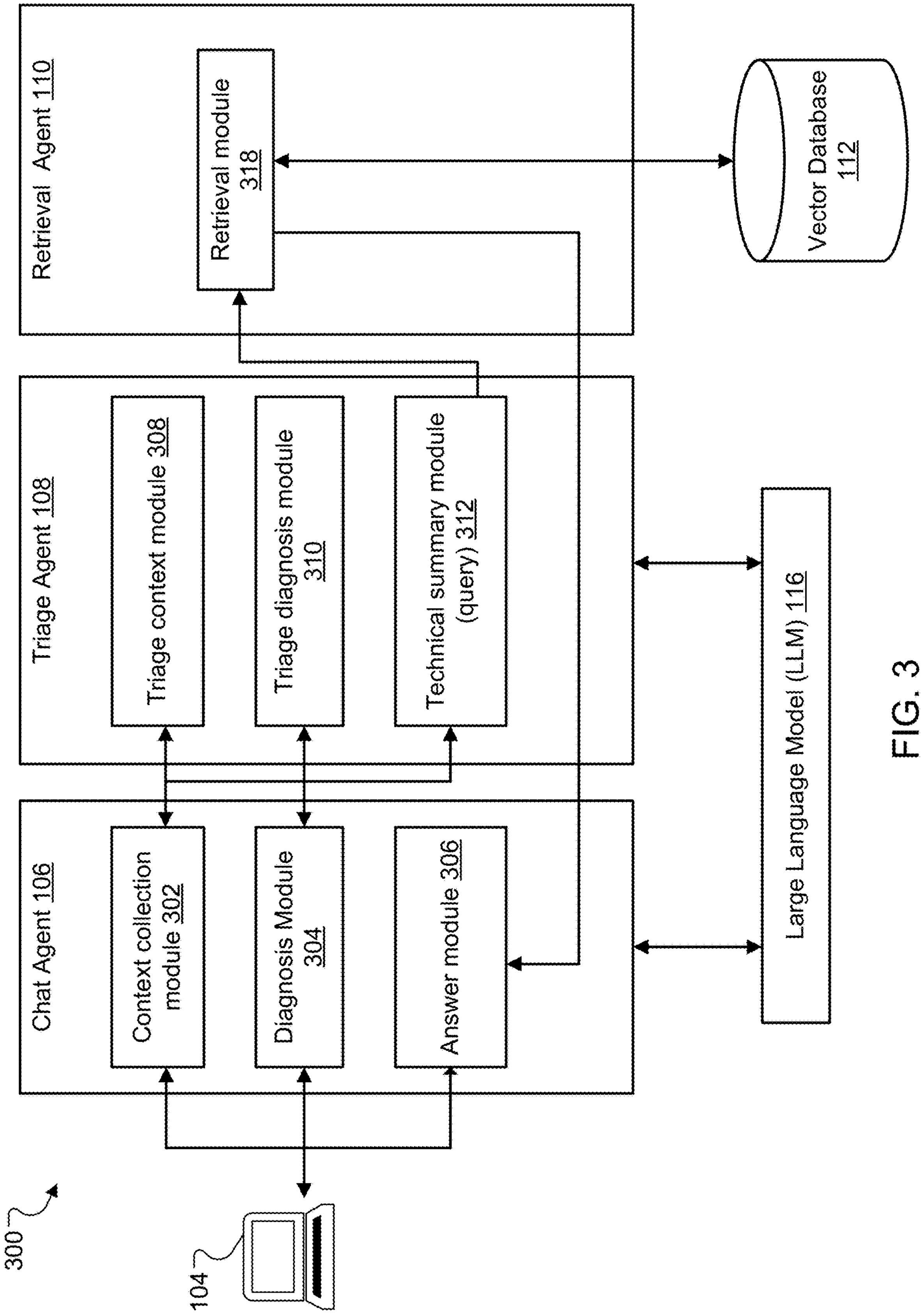
FIG. 3 shows an example architecture of the chat agent, the triage agent, and retrieval agent in conversational mode.

FIG. 3 shows an example architecture 300 of the chat agent, the triage agent, and retrieval agent in conversational mode.

The chat agent 106 includes a context collection module 302, a diagnosis module 304, and an answer module 306. The triage agent 108 includes a triage context module 308, a triage diagnosis module 310, and a technical summary module 312. The retrieval agent 110 includes a retrieval module 318. Each module is a software-based system, subsystem, or process that is programmed to perform one or more specific functions. Generally, a module will be implemented as one or more software components, installed on one or more computers in one or more locations. In some cases, one or more computers will be dedicated to a particular module: in other cases, multiple modules can be installed and running on the same computer or computers.

The chat agent 106 is configured to receive, using a context collection module 302, a user input at a chat window displayed at a user interface of the user device. The user input relates to a technical problem associated with a product or service. The context collection module 302 is configured to transmit the user input to the triage context module 308 of the triage agent 108.

The triage context module 308 is configured to generate, based on the user input, one or more questions to be asked to the user to gather context information of the technical problem. The triage context module 308 is configured to transmit the one or more questions to the context collection module 302 of the chat agent 106. The contact collection module 302 of the chat agent 106 is further configured to chat with the user to ask the questions received from the triage context module 308. In this process, the context collection module 302 of the chat agent 106 receives one or more answers from the user which include the context information of the technical problem. At the conclusion of context collection, the context collection module 302 of the chat agent 106 transmits the context information to the triage diagnosis module 310 of the triage agent 108. The triage diagnosis module 310 is configured to determine, based on the context information, the list of possible diagnoses and root causes of the technical problem.

The triage diagnosis module 310 is configured to transmit the list of possible diagnoses and root causes to the diagnosis module 304 of the chat agent 106 for determining a diagnose and a root cause of the technical problem. The diagnosis module 304 is configured to chat with the user to go through the list of possible diagnoses and root causes and to determine a diagnose and root cause of the technical problem. The diagnosis module 304 transmits the determined diagnosis and the root cause of the technical problem and the conversational history to the technical summary module 312. The technical summary module 312 is configured to generate a technical summary of the context, diagnosis and root cause of the technical problem. The technical summary module 312 is configured to transmit the technical summary to the retrieval module 318 of the retrieval agent 110.

The retrieval module 318 of the retrieval agent 110 is configured to convert the technical summary received into a query embedding. For example, the query embedding can be a vector that includes a dense representation of the query in a semantic latent space. The retrieval module 318 of the retrieval agent 110 is further configured to query the vector database 112 using the query embedding to retrieve one or more documents. Each of the one or more documents has a respective document embedding that matches the query embedding. In some implementations, the respective document embedding matches the query embedding when the respective document embedding is the same as the query embedding. In some other implementations, the respective document embedding matches the query embedding when the respective document embedding is within a threshold distance of the query embedding. For example, the threshold distance can be a Euclidean distance. In some other implementations, the respective document embedding matches the query embedding when a level of similarity between the respective document embedding and the query embedding exceeds a threshold level. For example, the level of similarity is a cosine similarity between the respective document embedding and the query embedding.

The retrieval agent 110 is configured to send the retrieved one or more documents to the answer module 306. The answer module 306 is configured to, based on content of the one or more retrieved documents, chat with the user to walk them through the documents step-by-step so as to solve their technical problem, displaying the responses in the chat window at the user interface.

FIG. 4 illustrates an example process for processing documents and retrieving, from a vector database 406, one or more documents relevant to the search query.

The vector database 406 is a domain-specific database. That means, the vector database 406 includes multiple documents 402 that include domain-specific knowledge. For example, the documents may include knowledge of the legal industry, the financial industry, or accounting industry.

Each document in the vector database 406 is converted into a respective document embedding. The document embedding is a representation of the meaning of the document.

The vector database 406 is configured to store all of the document embeddings 404.

When a user sends a user input to the chat agent, the user input is sent to the triage agent, by which a search query is generated. The search query is converted into a query embedding by the retrieval agent.

From the vector database 406, the retrieval module of the retrieval agent 408 obtains one or more documents having document embeddings that match the query embedding. In some implementations, the respective document embedding matches the query embedding when the respective document embedding is the same as the query embedding. In some other implementations, the respective document embedding matches the query embedding when the respective document embedding is within a threshold distance of the query embedding. For example, the threshold distance can be a Euclidean distance. In some other implementations, the respective document embedding matches the query embedding when a level of similarity between the respective document embedding and the query embedding exceeds a threshold level. For example, the level of similarity is a cosine similarity between the respective document embedding and the query embedding.

FIG. 6 illustrates an example user interface of chatbot that implements the multi-agent generative AI system.

As show in FIG. 6, in the chat window 610, the chat agent displays a prompt to the user to identify the user's problem: "How may I help you? Please try to be as detailed as possible" (602). The user describes the problem in the dialog box 604. The chat agent displays a prompt to gather context information around the user's issue (606 and 610). The user responses to these prompts (608) and the conversation continues until the chat agent provides a solution to the user's problem.

FIG. 6 depicts an example computing system, according to implementations of the present disclosure. The system 600 may be used for any of the operations described with respect to the various implementations discussed herein. The system 600 may include one or more processors 610, a memory 620, one or more storage devices 630, and one or more input/output (I/O) devices 660 controllable through one or more I/O interfaces 640. The various components 610, 620, 630, 640, or 660 may be interconnected through at least one system bus 650, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices: magnetic disks such as internal hard disks and removable disks: magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 660. The I/O device(s) 660 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 660 may also include one or more output devices such as a display, LED(s), an audio output device (e.g., a speaker), a printer, a haptic output device, and so forth. The I/O device(s) 660 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 660. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

This specification uses the term "configured" in connection with systems and computer program components. For a system of one or more computers to be configured to perform particular operations or actions means that the system has installed on it software, firmware, hardware, or a combination of them that in operation cause the 20) system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine: in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A multi-agent system for automated chatting, the system comprising: at least one data storage device storing a vector database, wherein the vector database comprises (i) a plurality of documents, and (ii) for each document of a plurality of documents, a respective document embedding that represents a semantic meaning of the document;

at least one processor; and a memory communicatively coupled to the at least one processor, the memory storing instructions which, when executed by the at least one processor, cause the at least one processor to implement a computerized generative artificial intelligence (AI) chat agent, a computerized generative AI retrieval agent, and a computerized generative AI triage agent;

wherein the computerized generative AI triage agent is configured for communication with the computerized generative AI chat agent, the computerized generative AI retrieval agent and a large language model (LLM) including a generative transformer model with an encoder and a decoder;

wherein the computerized generative AI triage agent is configured to guide a conversation between the computerized generative AI chat agent and a user of a user computing device displaying a chat window of the computerized generative AI chat agent by conducting reasoning on user input of the user;

wherein the computerized generative AI chat agent is configured to:

receive a user input at a chat window displayed at a user interface of a user computing device, and transmit at least the user input to the computerized generative AI triage agent;

wherein the computerized generative AI triage agent is configured to:

process at least the user input to create a search query, and transmit the search query to the computerized generative AI retrieval agent;

wherein the computerized generative AI retrieval agent is configured to:

convert the search query received from the computerized generative AI triage agent into a query embedding, query the vector database using the query embedding to retrieve one or more documents, each of the one or more documents having a respective document embedding that matches the query embedding, and send the retrieved one or more documents to the computerized generative AI triage agent;

wherein the computerized generative AI triage agent is further configured to:

based on the one or more documents, query the LLM for information to augment domain-specific knowledge contained in the one or more documents retrieved from the vector database by the computerized generative AI retrieval agent;

based at least on content of the one or more documents retrieved by the computerized AI generative retrieval agent and the information queried from the LLM, generate one or more instructions for a logical direction of a conversation between the user and the computerized generative AI chat agent, with a logical direction specifying a next step in the conversation between the user and the computerized generative AI chat agent, and transmit the one or more instructions to the computerized generative AI chat agent;

wherein the computerized generative AI chat agent is further configured to:

generate a response to the user input based on the one or more instructions, and display the response in the chat window at the user interface;

wherein each of the computerized generative AI chat agent, the computerized generative AI triage agent and the computerized generative AI retrieval agent is distinct from each other;

wherein the combination of the computerized generative AI chat agent, the computerized generative AI triage agent and the computerized generative AI retrieval agent reduces an amount of computational resources and data storage that would otherwise be required by a generative AI system to prevent hallucination.

2. The system of claim 1, wherein the respective document embedding of each document is a vector including a dense representation of the document in a semantic latent space.

3. The system of claim 1, wherein the query embedding is a vector including a dense representation of the query in a semantic latent space.

4. The system of claim 1, wherein the respective document embedding matches the query embedding when the respective document embedding is the same as the query embedding.

5. The system of claim 1, wherein the respective document embedding matches the query embedding when the respective document embedding is within a threshold distance of the query embedding.

6. The system of claim 5, wherein the threshold distance is an Euclidean distance.

7. The system of claim 1, wherein the computerized AI generative chat agent and the computerized AI generative triage agent are configured to interact with the LLM while processing the user input.

8. The system of claim 1, wherein the at least one of the encoder or the decoder is configured to apply a computerized attention mechanism over its respective inputs while processing the user input.

9. The system of claim 1, wherein the vector database is a domain-specific database.

10. The system of claim 1, wherein the computerized AI generative triage agent is further configured to:
monitor a number of negative messages from the user on the chat window, and
direct the chat to a human being if the number of negative message exceeds a threshold number.

11. The system of claim 1, wherein the computerized AI generative chat agent, the computerized AI generative triage agent and the computerized AI generative retrieval agent are embedded in a software application.

12. The system of claim 1, wherein the computerized AI generative triage agent comprises a prompt generating module and is further configured to:
generate, using the prompt generating module, based on the retrieved one or more documents, one or more prompts including one or more questions to the user to narrow down the retrieved one or more documents;
transmit the one or more prompts to the computerized AI generative chat agent;
receive, from the computerized AI generative chat agent, one or more answers of the user in response to the one or more prompts;
select, based on the one or more answers, a document from the retrieved one or more documents that is most relevant to the search query;
verify content of the selected document; and
transmit the selected document to the computerized AI generative chat agent.

13. A system for automated chatting, the system comprising:
at least one data storage device storing a vector database, wherein the vector database comprises (i) a plurality of documents, and (ii) for each document of a plurality of documents, a respective document embedding that represents a semantic meaning of the document;
at least one processor; and
a memory communicatively coupled to the at least one processor, the memory storing instructions which, when executed by the at least one processor, cause the at least one processor to implement a computerized generative artificial intelligence (AI) chat agent, a computerized generative AI retrieval agent, and a computerized generative AI triage agent;
wherein the computerized generative AI triage agent is configured for communication with the computerized generative AI chat agent, the computerized generative AI retrieval agent and a large language model (LLM) including a generative transformer model with an encoder and a decoder;
wherein the computerized generative AI triage agent is configured to guide a conversation between the computerized generative AI chat agent and a user of a user computing device displaying a chat window of the computerized generative AI chat agent by conducting reasoning on user input of the user;
wherein the computerized generative AI chat agent is configured to:
receive a user input at a chat window displayed at a user interface of a user computing device, wherein the user input relates to a technical problem associated with a product or a service, and
transmit the user input to the computerized generative AI triage agent;
wherein the computerized generative AI triage agent is configured to:
determine, based on the user input, a list of possible diagnoses and root causes of the technical problem,
transmit the list of possible diagnoses and root causes to the computerized generative AI chat agent for determining a diagnose and a root cause of the technical problem,
receive, from the computerized generative AI chat agent, a determination of the diagnosis and the root cause of the technical problem,
generate a technical summary of the diagnosis and root cause of the technical problem, and
transmit the technical summary to the computerized generative AI retrieval agent;
wherein the computerized generative AI retrieval agent is configured to:
convert the technical summary into a query embedding,
query the vector database using the query embedding to retrieve one or more documents, each of the one or more documents having a respective document embedding that matches the query embedding, and
send the retrieved one or more documents to the computerized generative AI triage agent;
wherein the computerized generative AI triage agent is further configured to:
based on the one or more documents, query the LLM for information to augment domain-specific knowledge contained in the one or more documents retrieved from the vector database by the computerized generative AI retrieval agent;
based at least on content of the one or more documents retrieved by the computerized AI generative retrieval agent and the information queried from the LLM, generate one or more instructions for a logical direction of a conversation between the user and the computerized generative AI chat agent, with a logical direction specifying a next step in the conversation between the user and the computerized generative AI chat agent, and
transmit the one or more instructions to the computerized generative AI chat agent;
wherein the computerized generative AI chat agent is further configured to:
based at least on content of the one or more documents, generate a response to the user input based on the one or more instructions, and
display the response in the chat window at the user interface;
wherein each of the computerized generative AI chat agent, the computerized generative AI triage agent and the computerized generative AI retrieval agent is distinct from each other;
wherein the combination of the computerized generative AI chat agent, the computerized generative AI triage agent and the computerized generative AI retrieval agent reduces an amount of computational resources and data storage that would otherwise be required by a generative AI system to prevent hallucination.

14. The system of claim 13, wherein determining, based on the user input, the list of possible diagnoses and root causes of the technical problem comprises:
generating, based on the user input, one or more questions to the user to gather context information of the technical problem;

transmitting the one or more questions to the computerized AI generative chat agent;

receiving, from the computerized AI generative chat agent, one or more answers from the user, the one or more answers comprising the context information of the technical problem; and determine, based on the context information, the list of possible diagnoses and root causes of the technical problem.

15. The system of claim 13, wherein the respective document embedding of each document is a vector including a dense representation of the document in a semantic latent space.

16. The system of claim 13, wherein the query embedding is a vector including a dense representation of the query in a semantic latent space.

17. The system of claim 13, wherein the respective document embedding matches the query embedding when the respective document embedding is the same as the query embedding.

18. The system of claim 13, wherein the respective document embedding matches the query embedding when the respective document embedding is within a threshold distance of the query embedding.

19. A method implemented by multi-agent system for automated chatting, comprising:

storing, by at least one data storage device, a vector database, wherein the vector database comprises (i) a plurality of documents, and (ii) for each document of a plurality of documents, a respective document embedding that represents a semantic meaning of the document;

storing instructions which, when executed by at least one processor, cause the at least one processor to implement a computerized generative artificial intelligence (AI) chat agent, a computerized generative AI retrieval agent, and a computerized generative AI triage agent;

wherein the computerized generative AI triage agent is configured for communication with the computerized generative AI chat agent, the computerized generative AI retrieval agent and a large language model (LLM) including a generative transformer model with an encoder and a decoder;

wherein the computerized generative AI triage agent guides a conversation between the computerized generative AI chat agent and a user of a user computing device displaying a chat window of the computerized generative AI chat agent by conducting reasoning on user input of the user;

receiving, by the computerized generative AI chat agent, a user input at a chat window displayed at a user interface of a user computing device, transmitting, by the computerized generative AI chat agent, at least the user input to the computerized generative AI triage agent;

processing, by the computerized generative AI triage agent, at least the user input to create a search query, and transmitting, by the computerized generative AI triage agent, the search query to the computerized generative AI retrieval agent;

converting, by the computerized generative AI retrieval agent, the search query received from the computerized generative AI triage agent into a query embedding;

querying, by the computerized generative AI retrieval agent, the vector database using the query embedding to retrieve one or more documents, each of the one or more documents having a respective document embedding that matches the query embedding;

sending, by the computerized generative AI retrieval agent, the retrieved one or more documents to the computerized generative AI triage agent;

based on the one or more documents, querying, by the computerized generative AI triage agent, the LLM for information to augment domain-specific knowledge contained in the one or more documents retrieved from the vector database by the computerized generative AI retrieval agent;

based at least on content of the one or more documents retrieved by the computerized AI generative retrieval agent and the information queried from the LLM, generating, by the computerized generative AI triage agent, one or more instructions for a logical direction of a conversation between the user and the computerized generative AI chat agent, with a logical direction specifying a next step in the conversation between the user and the computerized generative AI chat agent;

transmitting, by the computerized generative AI triage agent, the one or more instructions to the computerized generative AI chat agent;

generating by the computerized generative AI chat agent, a response to the user input based on the one or more instructions, and display the response in the chat window at the user interface;

wherein each of the computerized generative AI chat agent, the computerized generative AI triage agent and the computerized generative AI retrieval agent is distinct from each other;

wherein the combination of the computerized generative AI chat agent, the computerized generative AI triage agent and the computerized generative AI retrieval agent reduces an amount of computational resources and data storage that would otherwise be required by a generative AI system to prevent hallucination.

20. One or more machine-readable storage devices storing instructions that are executable by one or more processors to perform operations comprising:

storing, by at least one data storage device, a vector database, wherein the vector database comprises (i) a plurality of documents, and (ii) for each document of a plurality of documents, a respective document embedding that represents a semantic meaning of the document;

storing instructions which, when executed by at least one processor, cause the at least one processor to implement a computerized generative artificial intelligence (AI) chat agent, a computerized generative AI retrieval agent, and a computerized generative AI triage agent;

wherein the computerized generative AI triage agent is configured for communication with the computerized generative AI chat agent, the computerized generative AI retrieval agent and a large language model (LLM) including a generative transformer model with an encoder and a decoder;

wherein the computerized generative AI triage agent guides a conversation between the computerized generative AI chat agent and a user of a user computing device displaying a chat window of the computerized generative AI chat agent by conducting reasoning on user input of the user;

receiving, by the computerized generative AI chat agent, a user input at a chat window displayed at a user interface of a user computing device, transmitting, by the computerized generative AI chat agent, at least the user input to the computerized generative AI triage agent;

processing, by the computerized generative AI triage agent, at least the user input to create a search query, and transmitting, by the computerized generative AI triage agent, the search query to the computerized generative AI retrieval agent;

converting, by the computerized generative AI retrieval agent, the search query received from the computerized generative AI triage agent into a query embedding;

querying, by the computerized generative AI retrieval agent, the vector database using the query embedding to retrieve one or more documents, each of the one or more documents having a respective document embedding that matches the query embedding;

sending, by the computerized generative AI retrieval agent, the retrieved one or more documents to the computerized generative AI triage agent;

based on the one or more documents, querying, by the computerized generative AI triage agent, the LLM for information to augment domain-specific knowledge contained in the one or more documents retrieved from the vector database by the computerized generative AI retrieval agent;

based at least on content of the one or more documents retrieved by the computerized AI generative retrieval agent and the information queried from the LLM, generating, by the computerized generative AI triage agent, one or more instructions for a logical direction of a conversation between the user and the computerized generative AI chat agent, with a logical direction specifying a next step in the conversation between the user and the computerized generative AI chat agent;

transmitting, by the computerized generative AI triage agent, the one or more instructions to the computerized generative AI chat agent;

generating by the computerized generative AI chat agent, a response to the user input based on the one or more instructions, and display the response in the chat window at the user interface;

wherein each of the computerized generative AI chat agent, the computerized generative AI triage agent and the computerized generative AI retrieval agent is distinct from each other;

wherein the combination of the computerized generative AI chat agent, the computerized generative AI triage agent and the computerized generative AI retrieval agent reduces an amount of computational resources and data storage that would otherwise be required by a generative AI system to prevent hallucination.

* * * * *